US005701803A

United States Patent [19]

Lutz

[11] Patent Number: 5,701,803

[45] Date of Patent: Dec. 30, 1997

[54] LIGHT-METAL PISTON FOR INTERNAL COMBUSTION ENGINES

[75] Inventor: Martin Lutz, Remshalden, Germany

[73] Assignee: Mahle GmbH, Stuttgart, Germany

[21] Appl. No.: 737,252

[22] PCT Filed: Mar. 16, 1995

[86] PCT No.: PCT/DE95/00370

§ 371 Date: Oct. 16, 1996

§ 102(e) Date: Oct. 16, 1996

[87] PCT Pub. No.: WO95/29332

PCT Pub. Date: Nov. 2, 1995

[30] Foreign Application Priority Data

Apr. 27, 1994 [DE] Germany .......................... 44 14 678.7

[51] Int. Cl.[6] .......................... F16J 1/04

[52] U.S. Cl. .......................... 92/208; 92/209; 123/193.6

[58] Field of Search .......................... 92/209, 208, 126; 123/193.6

[56] References Cited

U.S. PATENT DOCUMENTS

| | | | |
|---|---|---|---|
| 1,885,681 | 11/1932 | Buren . | |
| 2,544,775 | 3/1951 | Buren . | |
| 2,660,492 | 11/1953 | Lewis | 92/126 |
| 3,463,057 | 8/1969 | Packard et al. | 92/126 |
| 4,694,735 | 9/1987 | Tatematsu et al. | 92/208 |
| 4,890,543 | 1/1990 | Kudou et al. . | |
| 4,907,545 | 3/1990 | Mills | 123/193.6 |
| 5,054,375 | 10/1991 | Kawabata et al. . | |

FOREIGN PATENT DOCUMENTS

| | | |
|---|---|---|
| 3625492 | 2/1988 | Germany . |
| 3840841 | 6/1990 | Germany . |
| 479003 | 11/1969 | Switzerland . |
| 280098 | 1/1971 | U.S.S.R. . |
| 1687830 | 10/1991 | U.S.S.R. . |
| 105312 | 4/1917 | United Kingdom . |
| 509519 | 7/1939 | United Kingdom . |
| 741466 | 12/1955 | United Kingdom . |
| 867854 | 5/1961 | United Kingdom . |
| 1145873 | 3/1969 | United Kingdom . |
| 1232990 | 5/1971 | United Kingdom . |
| 2238596 | 11/1990 | United Kingdom . |

*Primary Examiner*—Thomas E. Denion
*Attorney, Agent, or Firm*—Collard & Roe, P.C.

[57] ABSTRACT

In order to improve the guidance of a light-metal piston for an internal combustion engine of a motor vehicle by obtaining a uniform behavior under different stresses of the pressure and/or counter pressure side of the piston skirt, the wall thickness of the piston skirt is made different in the region of its pressure and/or counterpressure regions from that in its other regions. In the pressure and counterpressure regions, there is a thickening on the inner side of the piston skirt which is gradually reduced from the lower edge of the skirt in a central plane in the piston length and pressure/counterpressure direction back to the normal thickness.

4 Claims, 1 Drawing Sheet

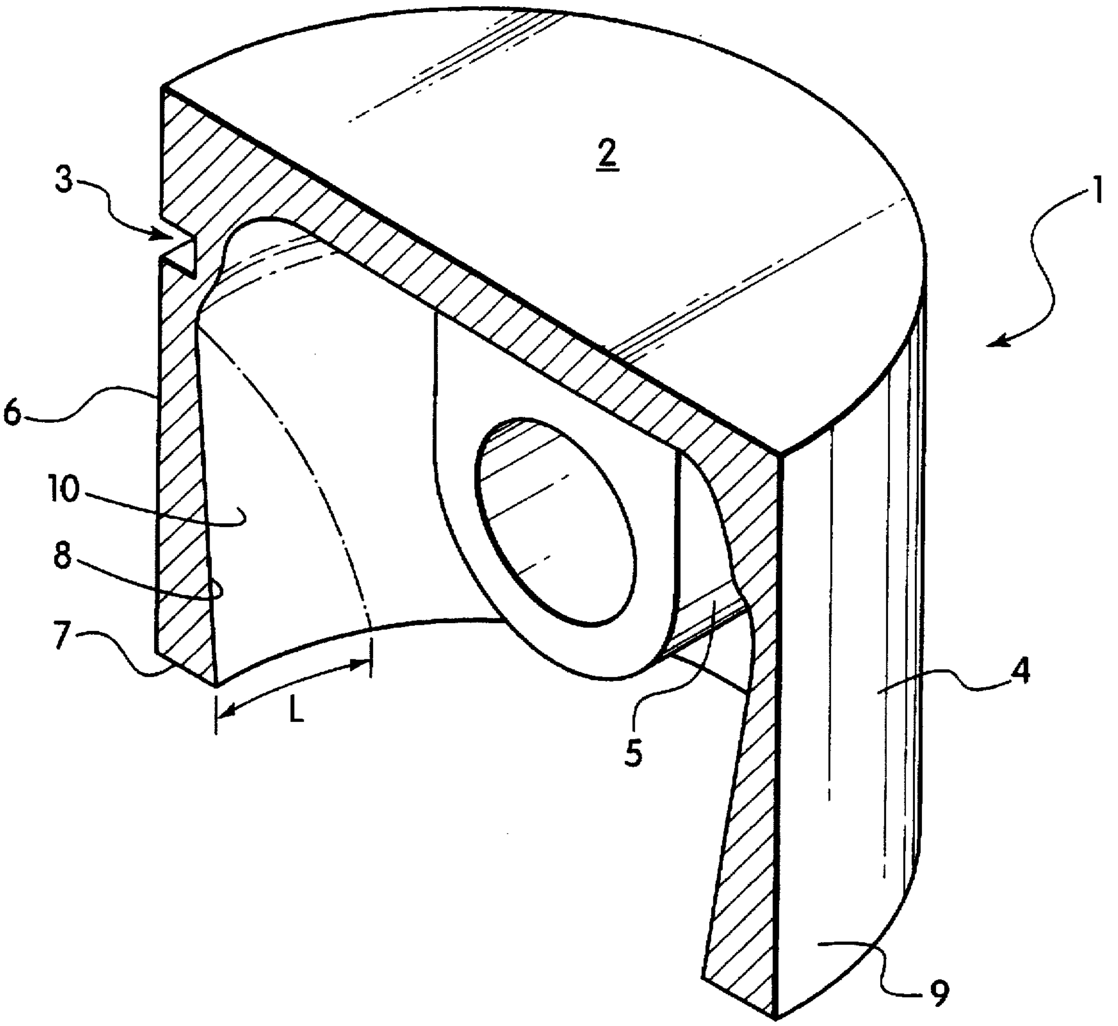
2
1
3
6
10
8
7
L
5
4
9

LIGHT-METAL PISTON FOR INTERNAL COMBUSTION ENGINES

BACKGROUND OF THE INVENTION

1. Field of the Invention

The invention relates to a light-metal piston for internal combustion engines according to the introductory part of claim 1.

2. The Prior Art

In connection with such light-metal pistons as known in practical life, it has been proposed earlier for the purpose of enhancing the supporting behavior of the piston skirt in the pressure-counterpressure direction to make provision within the zone of the open end of the skirt for a collar extending all around on the inside of the skirt in the form of a ring. Such a reinforcement, however, can not satisfy the current requirements with respect to the supporting behavior of the piston skirt for the guidance of the piston because an excessively high stiffness is still present particularly in the top half of the skirt, such stiffness representing an increased risk of seizing.

SUMMARY OF THE INVENTION

Therefore, the present invention addresses the problem of finding in a constructionally simple way a piston having within the zone of the pressure and/or counterpressure side of the piston skirt a uniform supporting behavior across the total height of the skirt.

Said problem is solved with a light-metal piston having the features according to the characterizing part of claim 1.

Advantageous embodiments according to the invention are shown in the dependent claims.

BRIEF DESCRIPTION OF THE DRAWING

The invention is explained in greater detail on a preferred exemplified embodiment shown in the drawing, which, in the form of a sketch, shows a perspective, sectional view of a piston according to the invention.

DETAILED DESCRIPTION OF THE PREFERRED EMBODIMENT

A light metal piston 1 for an internal combustion engine, in particular for a motor vehicle, consists in the form of one piece of a piston crown 2, a piston head having a piston ring groove part 3, and a piston skirt 4, whereby the piston pin bosses 5, the latter being suspended on the piston crown 2, serve for receiving the piston pin (not shown in the drawing).

In order to enhance the guiding behavior of the light-metal piston 1, i.e., in order to obtain a uniform pattern of support on the pressure side and/or the counter pressure side of the piston skirt 4, the wall thickness within the supporting range, for example of the pressure side 6 of the piston skirt 4, is designed in a way such that it continuously decreases, on the one hand, from the bottom edge 7, or, in the presence of a collar extending all around on the inside on the bottom end of the skirt, from the top edge of such collar across the total height of the skirt, whereby the inside contour 8 of the skirt extends conically, and, on the other hand, starting from the center plane extending in the longitudinal direction of the piston through the pressure side 6, counterpressure side 9 in the circumferential direction toward both sides, so that in the semi-section of the piston according to the drawing, a thickening 10 referred to as a so-called "delta collar" is obtained on the inside of the piston skirt 4, such thickening continuously changing into the piston skirt 4.

Such a design creates in a constructionally simple way a light-metal piston in connection with which a good running behavior of the piston is obtained, with an excellent support pattern on the pressure side and/or on the counterpressure side of the piston skirt, which, furthermore, also reduces the output of friction and the development of noise.

What is claimed is:

1. A light metal piston for internal combustion engines, comprising:

a piston crown;

a piston bottom;

a piston ring groove part; and a piston skirt, said piston bottom, said piston ring groove part and said piston skirt being integrally shaped in one piece, said piston skirt having a wall, a bottom edge, a height, an inside contour, a circumference, a pressure side and a counterpressure side, wherein the wall forms a thickening only in the area around at least one of the pressure and counterpressure sides, and wherein the thickness of the wall substantially continually decreases, starting from the bottom edge of the skirt along the height of the skirt, such that the inside contour of the skirt extends substantially conically.

2. A light metal piston according to claim 1, wherein the thickness of the thickening decreases in the circumferential direction along both sides of a center plane disposed in a longitudinal direction of the piston and extending through the pressure and counterpressure sides.

3. A light metal piston according to claim 2, wherein the thickening has a length measured in the circumferential direction from the center plane, said length decreasing continuously from the bottom edge along the height of the skirt.

4. A light metal piston according to claim 1, wherein the thickening continuously changes into the piston skirt on all sides.

* * * * *